United States Patent
Gysen et al.

(10) Patent No.: US 9,068,623 B2
(45) Date of Patent: Jun. 30, 2015

(54) ELECTROMAGNETIC ACTUATOR WITH INTEGRATED PASSIVE DAMPER

(75) Inventors: Bart Ludo Jozef Gysen, Lanaken (BE); Johannes Jacobus Hubertus Paulides, Waalwijk (NL); Elena Andreevna Lomonova, Eindhoven (NL); Laurentiu Encica, Eindhoven (NL); Bernardus Gerardus Van Leeuwen, Utrecht (NL)

(73) Assignee: SKF BV, Nieuwegein (NL)

(*) Notice: Subject to any disclaimer, the term of this patent is extended or adjusted under 35 U.S.C. 154(b) by 563 days.

(21) Appl. No.: 13/322,598

(22) PCT Filed: May 26, 2009

(86) PCT No.: PCT/EP2009/003719
§ 371 (c)(1),
(2), (4) Date: Apr. 5, 2012

(87) PCT Pub. No.: WO2010/136049
PCT Pub. Date: Dec. 2, 2010

(65) Prior Publication Data
US 2012/0193179 A1 Aug. 2, 2012

(51) Int. Cl.
*F16F 15/03* (2006.01)
*B60G 11/00* (2006.01)
(Continued)

(52) U.S. Cl.
CPC ............. *F16F 15/035* (2013.01); *B60G 11/00* (2013.01); *B60G 13/02* (2013.01); *B60G 15/00* (2013.01);
(Continued)

(58) Field of Classification Search
CPC ....... F16F 15/035; H01F 7/066; H02K 7/104; H02K 21/04

USPC ..................... 310/12.24; 188/267
See application file for complete search history.

(56) References Cited

U.S. PATENT DOCUMENTS 5,440,183 A * 8/1995 Denne ..................... 310/12.26
5,814,907 A * 9/1998 Bandera ..................... 310/14
(Continued)

FOREIGN PATENT DOCUMENTS

DE 102006035676 A1 2/2008
EP 0310997 A1 4/1989
(Continued)

OTHER PUBLICATIONS

Jiabin Wang and David Howe, "Tubular Modular Permanent-Magnet Machines Equipped With Quasi-Halbach Magnetized Magnets—Part I: Magnetic Field Distribution, EMF and Thrust Force," IEEE Transactions on Magnetics, vol. 41, No. 9, Sep. 2005, p. 2470-2478.

(Continued)

*Primary Examiner* — Anna Momper
(74) *Attorney, Agent, or Firm* — Bryan Peckjian; SKF USA Inc. Patent Dept.

(57) ABSTRACT

An electromagnetic actuator (100) comprises magnets (109, 111, 113, 115, 11), and a ferromagnetic structure (103) accommodating control conductors (118, 121, 123, 125). The magnets and the structure can move with respect to one another under control of control currents in the control conductors. The magnetic field in a gap (107) between the magnets and the ferromagnetic structure is oriented perpendicular to the direction of relative movement. The structure (103) accommodates damping conductors (127) that form closed loops of an electrically conductive material, different from the ferromagnetic material. The damping conductors (127) provide a damping force induced by the relative movement.

11 Claims, 5 Drawing Sheets

200

(51) Int. Cl.
  *B60G 13/02* (2006.01)
  *B60G 15/00* (2006.01)
  *B60G 17/015* (2006.01)
  *H01F 7/06* (2006.01)
  *H02K 41/03* (2006.01)
  *H02K 41/025* (2006.01)
  *H02K 21/04* (2006.01)
  *H02K 1/27* (2006.01)
  *H02K 7/104* (2006.01)

(52) U.S. Cl.
  CPC ............ *B60G 17/0157* (2013.01); *H01F 7/066* (2013.01); *H02K 41/031* (2013.01); *B60G 2202/16* (2013.01); *B60G 2202/422* (2013.01); *B60G 2202/44* (2013.01); *B60G 2202/442* (2013.01); *H02K 41/025* (2013.01); *H02K 21/04* (2013.01); *H02K 1/278* (2013.01); *H02K 7/104* (2013.01)

(56) References Cited

U.S. PATENT DOCUMENTS 7,948,123 B2 * 5/2011 Jajtic et al. ............. 310/12.24
2009/0174266 A1 * 7/2009 Jajtic et al. ............. 310/12.21

FOREIGN PATENT DOCUMENTS

| JP | 2005106242 A | 4/2005 |
| WO | WO 2007113046 A3 * | 11/2007 |
| WO | WO 2008015140 A1 * | 2/2008 |

OTHER PUBLICATIONS

Jiabin Wang and David Howe, "Tubular Modular Permanant-Magnet Machines Equipped With Quasi-Halbach Magnetized Magnets—Part II: Armature Reaction and Design Optimization," IEEE Transactions on Magnetics, vol. 41, No. 9, Sep. 2005, p. 2479-2489.

* cited by examiner

100

600

ELECTROMAGNETIC ACTUATOR WITH INTEGRATED PASSIVE DAMPER

CROSS-REFERENCE

This application is the US national stage of International Application No. PCT/EP2009/003719 filed on May 26, 2009.

FIELD OF THE INVENTION

The invention relates to an electromagnetic actuator, to a suspension system with at least one such electromagnetic actuator, and to a vehicle comprising a suspension system with at least one such electromagnetic actuator.

BACKGROUND ART

A linear actuator imparts a motion of an object along a linear path, e.g., back and forth, by means of applying a force to the object directed along the path traversed by the object. In an electromagnetic actuator, the force is generated through the interaction between a magnetic field and actively controlled electric currents flowing in conductors. The conductors are mounted at a piece of ferromagnetic material that is moveable with respect to the magnets generating the magnetic field.

The object is attached, or otherwise mechanically coupled, to either the piece of ferromagnetic material or the magnets. The ferromagnetic material serves to concentrate the flux of the magnetic field, thereby increasing the magnetic field strength at the locations of the conductors. As known, an electric charge moving in a magnetic field experiences a force, referred to as the Lorentz force. In the actuator, the Lorentz force acts on the conductors. The action-reaction principle of Newton's third law stipulates that a reaction force then acts on the magnets. The magnets and conductors in the actuator can move relative to one another, as a result of which the acting forces cause a relative motion. The magnetic field as experienced by the conductors may typically depend on the relative position of the conductors with respect to the magnets. The direction of the magnetic field vector may even change its polarity. Accordingly, the currents may need to be actively controlled in dependence on the position of the conductors with respect to the magnets.

Japanese patent application publication 2005106242 discloses an electromagnetic actuator with a damping force that is the combination of a first force, whose magnitude and direction depend on controlled currents in coils, and a second force, which is caused by passively inducing eddy currents. The damping force has a magnitude and a direction that depend on a relative velocity of two components of the known actuator. In case of an electric failure, the second force is still present and serves as a back-up. The actuator is used in a rail car and is located between the cart and the passenger compartment.

More specifically, the known actuator comprises a cylindrical shaft carrying on its outer surface a plurality of magnets. The shaft is moveable back and forth in a stator core. The stator core comprises a stack of ring-shaped, uniform units of a ferromagnetic material enclosing the shaft. Each unit has a profiled cross-section leaving a ring-shaped recess between two adjacent units of the stack in the inner wall of the stator core facing the shaft. The recess accommodates a coil. The magnets are ring-shaped magnets, positioned at suitable intervals around the shaft or, alternatively, tile-shaped magnets arranged in rings or in a spiral. The spatial distribution of the magnets along the shaft reflects the regular distance between neighbouring coils in the stator core. A sensor provides a sensor signal indicative of the position of the shaft relative to the stator core. From this sensor signal can be derived the relative velocity and relative acceleration of the shaft with respect to the stator core. This information is then used to actively provide damping via drive currents supplied to the coils. The passive damping results from eddy currents generated in the stator core's material by the magnets on the moving shaft. Damping force can be adjusted by choosing a ferromagnetic material for the stator core with a suitable volume resistivity. Furthermore, a radial slit is provided in a unit of the stator core that acts to restrict the eddy currents in order to further adjust the damping force.

An analysis of another known type of electromagnetic actuator is described in, e.g., "Tubular Modular Permanent-Magnet Machines Equipped With Quasi-Halbach Magnetized Magnets—Part I: Magnetic Field Distribution, EMF and Thrust Force", Jiabin Wang and David Howe, IEEE Transactions on Magnetics, Vol. 41, No. 9, September 2005, pp. 2470-2478; and "Tubular Modular Permanent-Magnet Machines Equipped With Quasi-Halbach Magnetized Magnets—Part II: Armature Reaction and Design Optimization", Jiabin Wang and David Howe, IEEE Transactions on Magnetics, Vol. 41, No. 9, September 2005, pp 2479-2489.

This known type of actuator has an outer tube with a linear array of ring-shaped magnets and an inner tube of a ferromagnetic material accommodating a linear array of coils. The outer tube surrounds the inner tube for at least part of its length, and the tubes are positioned coaxially. Both tubes have uniform cross sections. The coils are oriented so as to be substantially coaxial with the tubes. A gap, e.g., an air gap, spatially separates the inner and outer tubes from one another. The linear array of magnets is configured so as to create a magnetic field in the gap that is predominantly perpendicular to the common axis of the tubes. The polarity of the direction of the magnetic field depends on the location relative to the array of magnets. The array of magnets is implemented by means of, e.g., a cylindrical Halbach array. The inner tube is kept stationary and the outer tube is axially moveable with respect to the outer tube. Selectively driving the coils with currents of the proper polarity causes the outer tube to move as a result of a force on the magnetic array that is the reaction to the Lorentz forces on the coils. The spatial distribution of the coils along the inner tube and the spatial distribution of the magnets along the outer tube together determine which coils have to be driven in order to move the outer tube in a predetermined direction. Assume that the magnetic field in the gap has a regular pattern of regions of alternating polarity. Assume further that the coils are uniform and have a regular spatial distribution along the inner tube. Then, in order to control the outer tube's movement, different sub-sets of coils can be driven with different currents. Such a driving system is referred to as a multi-phase system. The currents are uniform per sub-set but have magnitudes and polarities that depend on the relative axial positions of the tubes. As the force applied to a driven coil is the Lorentz force, the magnitude of the force is proportional to the magnitude of the current in the coil. The coils are uniform and regularly distributed, as a result of which the combined force on the uniformly driven sub-set of coils is still proportional to the magnitude of the current. The inner tube is held stationary and, accordingly, the reaction force on the array of magnets has the same magnitude but has a direction opposite to the Lorentz force.

The current flow through the coils generates an additional magnetic field on its own. The total magnetic field is then the combination of the magnetic field of the magnets and this additional magnetic field. The magnitude of the additional magnetic field is, in general, much lower than the magnitude of the magnetic field of the magnets. However, for extreme current values, the magnitude of the additional magnetic field may become substantial. The magnitude of the magnetic field in the ferromagnetic material significantly increases until saturation of the ferromagnetic material is reached. As a result of the saturation, an increase of the driving current will then lead to an increase in the magnitude of the force that is substantially lower than proportional.

As pointed out in Japanese patent application publication 2005106242, a magnetic actuator can be used as an element in an actively controlled damping system as part of the suspension of a vehicle. In an active suspension system, the vehicle's conditions are electronically monitored. Information from wheel sensors (indicative of suspension extension), steering, and acceleration sensors is used to calculate the optimal stiffness. Control signals are then generated that determine the currents in the magnetic actuator, as a result of which the rate of movement, i.e., the compression-rebound rate, in the vehicle suspension is controlled, practically in real-time. Thus, the motion of the vehicle is directly controlled and its riding characteristics are improved. A problem with a suspension system that relies on active control only, is that no adequate damping may be provided if the system malfunctions, e.g., as a result of an electric failure in the control circuitry or a loosened connector or broken wire. The presence of an additional passive damping mechanism is therefore preferred.

SUMMARY OF THE INVENTION

The teachings of Japanese patent application publication 2005106242 could in principle be applied in order to implement a damping mechanism in the electromagnetic actuator of the type discussed in the publications of Jiabin Wang and David Howe, mentioned above. That is, in order to rely on passive damping, the tubular structure carrying the coils could be made from a stack of units, each unit being made from a material that has suitable ferromagnetic properties as well as suitable electrical resistivity properties. Radial slits could be provided in the units and the cross-sectional profiles designed in order to have the actuator provide the desired passive damping performance based on eddy current generation. However, this approach would determine those actuators' design parameters that also affect the active damping performance, thus ending up with a compromise solution at the most.

It is one of the objects of the invention to provide an alternative design of the electromagnetic actuator that better approaches the ideal solution than the approach advocated in Japanese patent application publication 2005106242.

For these and other reasons, the inventors propose an electromagnetic actuator comprising an arrangement of a first plurality of magnets for generating a magnetic field in a region adjacent to the arrangement. The actuator also has a structure of a ferromagnetic material. The structure is at least partly accommodated within the magnetic field. The structure itself accommodates a second plurality of control current conductors. The arrangement and the structure are configured for moving with respect to one another under control of respective control currents in respective ones of the second plurality of control current conductors. The arrangement and the structure are spatially separated by a gap. The magnetic field in the gap is oriented substantially perpendicular to a direction of relative movement of the arrangement and the structure. The structure accommodates one or more damping current conductors, each respective one thereof forming a respective closed loop of an electrically conductive material, different from the ferromagnetic material, for providing a respective damping force induced by relative movement.

Effectively, the force developed in the actuator in the invention linearly depends on the control current and also depends linearly on the relative velocity of the magnets and the ferromagnetic structure. The linear dependence on the relative velocity is a result of the damping current conductors, and can be used as a passive safety feature in case the circuitry supplying the control currents develops a failure and gets disabled. The linear dependencies facilitate designing an actuator that complies with pre-determined specifications.

The electrically conductive material is non-magnetic for all practical purposes of the actuator. Suitable electrically conductive materials are, e.g., copper, aluminum, stainless steel, silver, gold, etc. An electrically conductive material with a higher conductivity gives rise to a higher level of damping, assuming that the values of all other design parameters, relevant to the level of damping, are unchanged. Using a damping current conductor, made from a non-magnetic material with high electrical conductivity, has the advantage that the damping current conductor practically does not affect the active control resulting from the control currents. At higher relative speeds between the components, the ferromagnetic material will also start to provide some passive damping as a result of eddy currents in the ferromagnetic material. At lower relative speeds, only the damping current conductor provides the passive damping.

In an embodiment of the actuator, the arrangement of the first plurality of magnets and the structure of ferromagnetic material are configured for moving coaxially with respect to one another along a common axis. The first plurality of magnets forms a linear array parallel to the common axis. A specific one of the one or more damping current conductors is positioned in a specific plane, perpendicular to the common axis and comprising a specific one of the control current conductors. The specific damping current conductor is positioned between the specific current conductor and the arrangement. This embodiment is suitable as a linear actuator. The location of the damping current conductor, as specified, ensures a close proximity to the magnets and, as a result, a relatively high damping force.

In another embodiment of the actuator, the arrangement and the structure are configured for moving coaxially with respect to one another, around a common axis. The first plurality of magnets forms a linear array around the common axis. The one or more damping current conductors and the control current conductors together form a further linear array around the common axis. This embodiment is suitable as a rotational actuator.

The invention also relates to a suspension system configured for a wheeled vehicle, e.g., a road vehicle or a vehicle for rail transport, and comprising at least one electromagnetic actuator of a configuration as specified above.

The invention further relates to a wheeled vehicle, e.g., a road vehicle or a vehicle for rail transport, comprising a suspension system with at least one electromagnetic actuator of a configuration as specified above.

BRIEF DESCRIPTION OF THE DRAWINGS

The invention is explained in further detail, by way of example and with reference to the accompanying drawings, wherein.

Throughout the Figures, similar or corresponding features are indicated by same reference numerals.

DETAILED EMBODIMENTS

Figure 1:
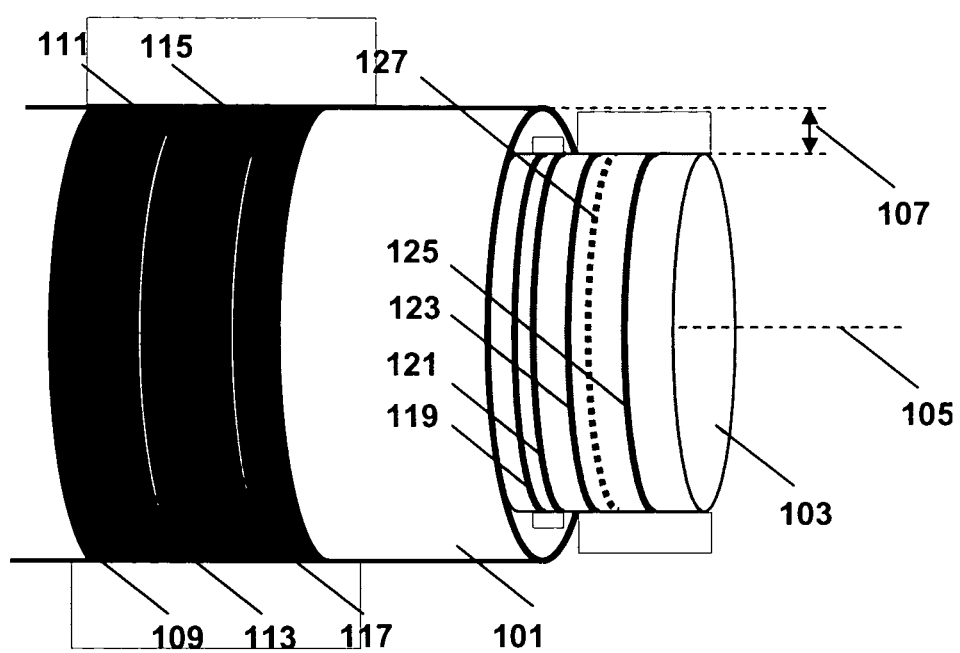
FIG. 1 is a diagram of a first type of an actuator in the invention.

FIG. 1 is a generic diagram of an actuator 100 of the invention. The actuator 100 comprises first and second components 101 and 103 that are moveable with regard to one another. In the example shown, the components 101 and 103 are coaxial straight cylinders, moveable with respect to one another along their common axes coinciding with a line 105. The width of the gap between the components 101 and 103 is indicated with reference numeral 107. The components 101 and 103 are kept properly aligned with respect to one another by means of a sliding bearing (not shown) present in the space between the components 101 and 103. An array of permanent magnets 109, 111, 113, 115 and 117, is arranged on one of the components 101 and 103, in this example on the component 101. The array extends in a direction parallel to the line 105, i.e., in the axial direction. The other one of the components 101 and 103, in this example the component 103, is made of a ferromagnetic material, and accommodates control current conductors 119, 121, 123 and 125. In operational use of the actuator 100, the control current conductors 119-125 carry a controlled driving current in order to move the components 101 and 103 relative to one another parallel to the line 105 under the influence of the Lorentz force. The control current conductors 119-125 are oriented so that the current in any of the control current conductors 119-125 lies in a plane substantially perpendicular to the direction of movement. In the example shown, the array of the magnets 109-117 is positioned on the outer cylinder 101 and the control current conductors 119-125 are arranged on the inner cylinder 103. The magnetization per individual one of the magnets 109-117 is such that there is a magnetic field in the gap between the components 101 and 103 that varies in dependence on the position along the line 105. The magnetic field is directed substantially perpendicularly to the direction of relative movement, i.e., the field is substantially radial. The direction of the magnetic field in the gap has a polarity that alternates from one magnet to the next one. Operation of the actuator 100 is based on actively driving the control current conductors 119-125 with control currents, whose magnitudes and polarities depend on the positions of the control current conductors 119-125 relative to the magnets 109-117. So far, the above configuration is known in the art.

In an actuator 100 of the invention, one or more damping current conductors are provided at the component carrying the control current conductors, here the component 103. In the example of FIG. 1, only a single damping current conductor 127 is indicated in order to not obscure the drawing. Each respective one of the damping current conductors, e.g., the conductor 127, forms a respective closed loop of an electrically conductive material, different from the ferromagnetic material of the component 103. The damping current conductor 127 provides a damping force as a result of the relative movement of the components 101 and 103 relative to one another. Note that the damping force is a passive force in the sense that the damping effect is still present if the control circuitry (not shown) configured for driving the currents in the control current conductors 119-125, is disabled, e.g., as a result of a failure. Accordingly, the damping current conductor 127 can be used as a safety measure, e.g., in case the actuator 100 forms part of an actively controlled suspension system for a road vehicle.

The control currents flowing in the control current conductors 119-125 cause the components 101 and 103 to exert a force on each other. Consider a practical configuration with the magnets 109-117 regularly spaced and with the control current conductors 119-125 regularly. In order to control the force, the magnitudes and polarities of the control currents are controlled to vary in dependence on the relative positions of the components 101 and 103. The control current flowing in a specific one of the control current conductors 119-125 can be expressed as a product of an amplitude and a phase function. The amplitude of the control currents is chosen to be uniform for all control currents. The phase function per control current expresses the dependence of the control current on the position of the specific one of the control current conductors 119-125, which carries the control current, relative to the magnetic field of the magnets 109-117. The phase function therefore determines the magnitude and polarity of the control current in a specific one of the control current conductors 119-125. In such a practical configuration, the force "$F_1$" between the components 101 and 103 is linearly dependent on the amplitude "i" of the current:

$$F_1 = K_1 \cdot i,$$

wherein the factor "$K_1$" is determined by design parameters.

When the components 101 and 103 are moving with respect to one another, the damping current conductor 127 experiences a changing magnetic field. The changing magnetic field induces a voltage in the damping current conductor 127. The electrically conductive material forming the damping current conductor 127 has a finite, but low, electrical resistance. As a result, a damping current will flow in the loop of the damping current conductor 127. The damping current has such a polarity that the Lorentz force experienced by the damping current conductor 127 will oppose the change in the experienced magnetic field, thus providing a damping force. The magnitude of the damping force depends linearly on the magnitude of the damping current that in turn depends linearly on the induced voltage. As the induced voltage depends linearly on the relative velocity "v" of the components 101 and 103, the damping force "$F_2$" depends linearly on the velocity "v":

$$F_2 = -K_2 \cdot v.$$

Accordingly, the resultant force "F" that the components 101 and 103 exert on each other in an actuator of the invention can be expressed as:

$$F = K_1 \cdot i - K_2 \cdot v.$$

Note that the damping force is always present when the components 101 and 103 are moving with regard to each other. Therefore, passive damping is provided also in case the active control by means of the control currents gets disabled, e.g., as a result of some malfunctioning of the control circuitry supplying the control currents to the control current conductors 119-125.

Also note that the linear dependencies on control current amplitude and on relative velocity simplify the design of an actuator with pre-specified active force characteristics and passive damping characteristics.

The ferromagnetic material of the component 103 has itself a finite electrical resistivity. The movement of the component 103 relative to the magnetic field generated by the magnets 109-117 will therefore generate eddy currents in the ferromagnetic material and, as a result, a passive damping force. For positioning applications, this damping force is undesired and the resistivity of the ferromagnetic material in the direction of the eddy currents is increased by use of laminations of the ferromagnetic material. For automotive damping applications, this amount of damping is too low and hence one or more additional passive damping current conductors, e.g., the conductor 127, are used. The damping current conductors are made from a high-conductivity material. In the actuator of the invention, the passive damping relies on the damping current conductors instead of on the ferromagnetic material of the component 103. Accordingly, the passive damping characteristics can be optimized without affecting the actively controlled damping operation through suitably adjusting design features relevant to the passive damping. One such feature is the type of electrically conductive material used for the damping current conductors. Copper is an attractive option as it has a high electrical conductivity and is non-magnetic. Other examples of suitable materials have been mentioned above. A damping current conductor, made from a non-magnetic material with high electrical conductivity, has the advantage that the presence of the damping current conductor practically does not affect the magnetic field as experienced by the control current conductors at low relative speeds. At higher relative speeds between the components 101 and 103, the ferromagnetic material of the component 103 will also start to provide some passive damping as a result of induced eddy currents and hysteresis in the ferromagnetic material. At lower relative speeds, only the damping current conductor provides significant passive damping.

In an embodiment of the actuator 100, the damping current conductor 127 is ring made of solid material and mounted to the component 103. In another embodiment, the damping current conductor 127 is created by means of drawing a closed loop with a suitable, electrically conductive, paint. Such paint is known from, e.g., repair kits for repairing broken tracks on printed circuit boards.

The components 101 and 103 can be configured as a pair of nested straight cylinders, as a pair of segments of nested tori, etc. In the case of nested tori, the line 105 is a segment of a circle and the components 101 and 103 move relative to one another in a curvilinear path.

As mentioned, there is a space of width 107 between the components 101 and 103, so as to have them moveable with regard to one another. The space can be filled with air or another gas.

Figure 2:
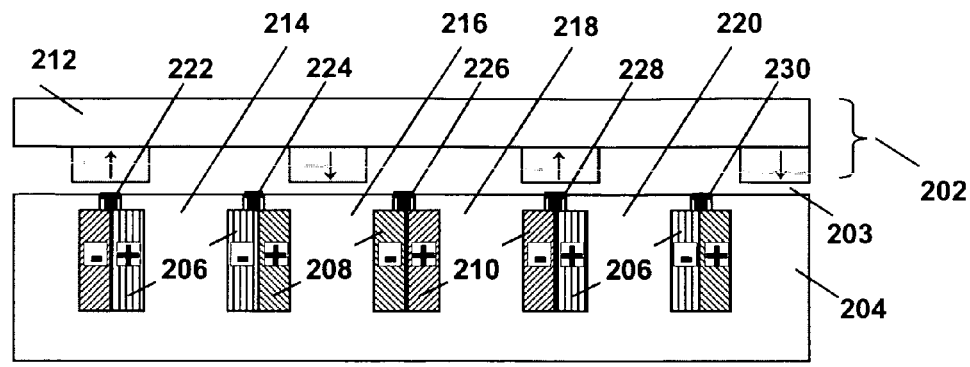
FIGS. 2, 3, 4 are diagrams illustrating several embodiments of an actuator in the invention.
Figure 3:
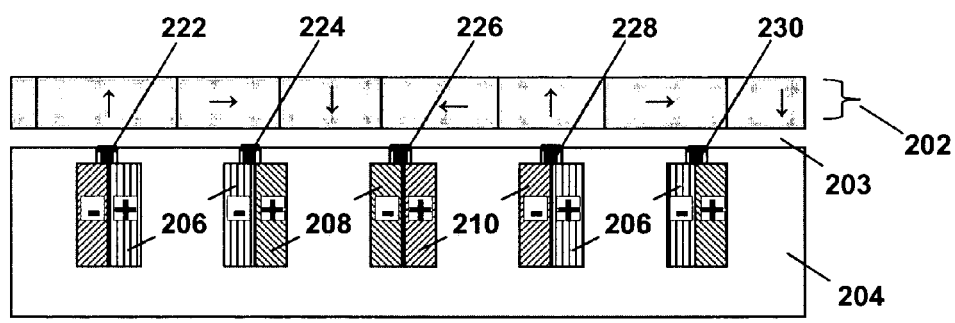
Figure 4:
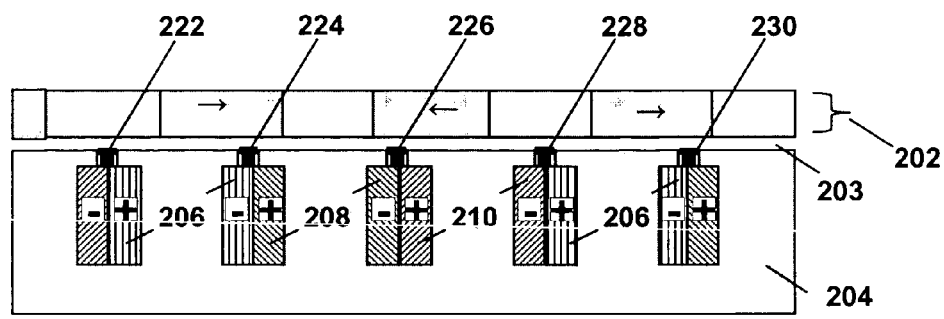

FIGS. 2, 3 and 4 are diagrams of various embodiments 200, 300 and 400 of the actuator 100. Each of the FIGS. 2-4 gives half of a cross section through the actuator in a plane spanned by the line 105 and a vector perpendicular to the line 105. Only one half of the cross section is given as the other half is a mirror image. Each of the embodiments 200, 300 and 400 comprises a linear array of magnets 202 and a ferromagnetic structure 204 with recesses that accommodate electrically conductive control conductors 206, 208, and 210, each whereof is formed as a coil. The recesses give the structure 204 a toothed shape, as indicated by teeth 214, 216, 218 and 220 in the FIG. 2. In order to not obscure the drawing, the indications of the teeth have been omitted from the FIGS. 3 and 4. The coils 206, 208 and 210 form a configuration with a periodicity that matches the periodicity of the magnetic field created by the array 202, as will be explained below. Note that in the FIGS. 2-4, the coils 206-210 are represented by half their cross sections in the aforementioned plane. The plus signs and minus signs in the coils 206-210 indicate opposite directions of a driving current perpendicular to the plane of the drawing.

The array 202 and the structure 204 are separated by an air gap 203 so as to be freely moveable with respect to one another in the horizontal direction in the drawing. For example, the position of the structure 204 is held fixed relative to the outside world and the array 202 is moveable with respect to the structure 204. The structure 204 is then called a stator, and the array 202 a translator. The magnetization per individual one of the magnets of the array 202 is such that there is a dominant magnetic field in the air gap 203 that has a direction which is perpendicular to the direction of relative movement of the array 202 and the structure 204 with respect to one another. The dominant direction of the magnetic field in the air gap 203 has a polarity that alternates from one magnet to the next one in the array 202.

The embodiments 200, 300 and 400 have a similar structure 204, but differ in the manner wherein the magnet array 202 is constructed. In the embodiment 200, magnets are mounted on a ferromagnetic carrier 212 and face the structure 204. The direction of the magnetization is indicated with an arrow per individual one of the magnets of the array 202. The magnets of the array 202 have a normal magnetization, the term "normal" referring to the perpendicular orientation of the field relative to the direction of movement. In the embodiment 300, the array 202 is implemented as a Halbach array. As known, a Halbach array is a particular configuration of permanent magnets that reinforces the strength of the magnetic field on one side of the array while reducing the magnitude of the field to almost zero on the other side of the array. Again, the arrows in drawn in the magnets indicate per individual magnet the direction of magnetization. In the embodiment 400, the array 202 has a tangential magnetization, as indicated by the arrows.

The implementations of the magnetic array 202 in the embodiments 200, 300 and 400 are given by way of example. Other implementations are feasible so long as there is a dominant normal (i.e., perpendicular) magnetic field across the air gap 203 separating the magnetic array 202 from the ferromagnetic structure 204.

The embodiments 200-400 also accommodate damping current conductors 222, 224, 226, 228 and 230. Each of the damping current conductors 222-230 forms a closed loop of an electrically conductive material, different from the ferromagnetic material of the structure 204, for providing a respective damping force as a result of the relative movement. Preferably, the damping current conductors 222-230 are made from a non-magnetic material such as copper in order to not affect the magnetic field experienced by the control current conductors 206-210.

Figure 5:
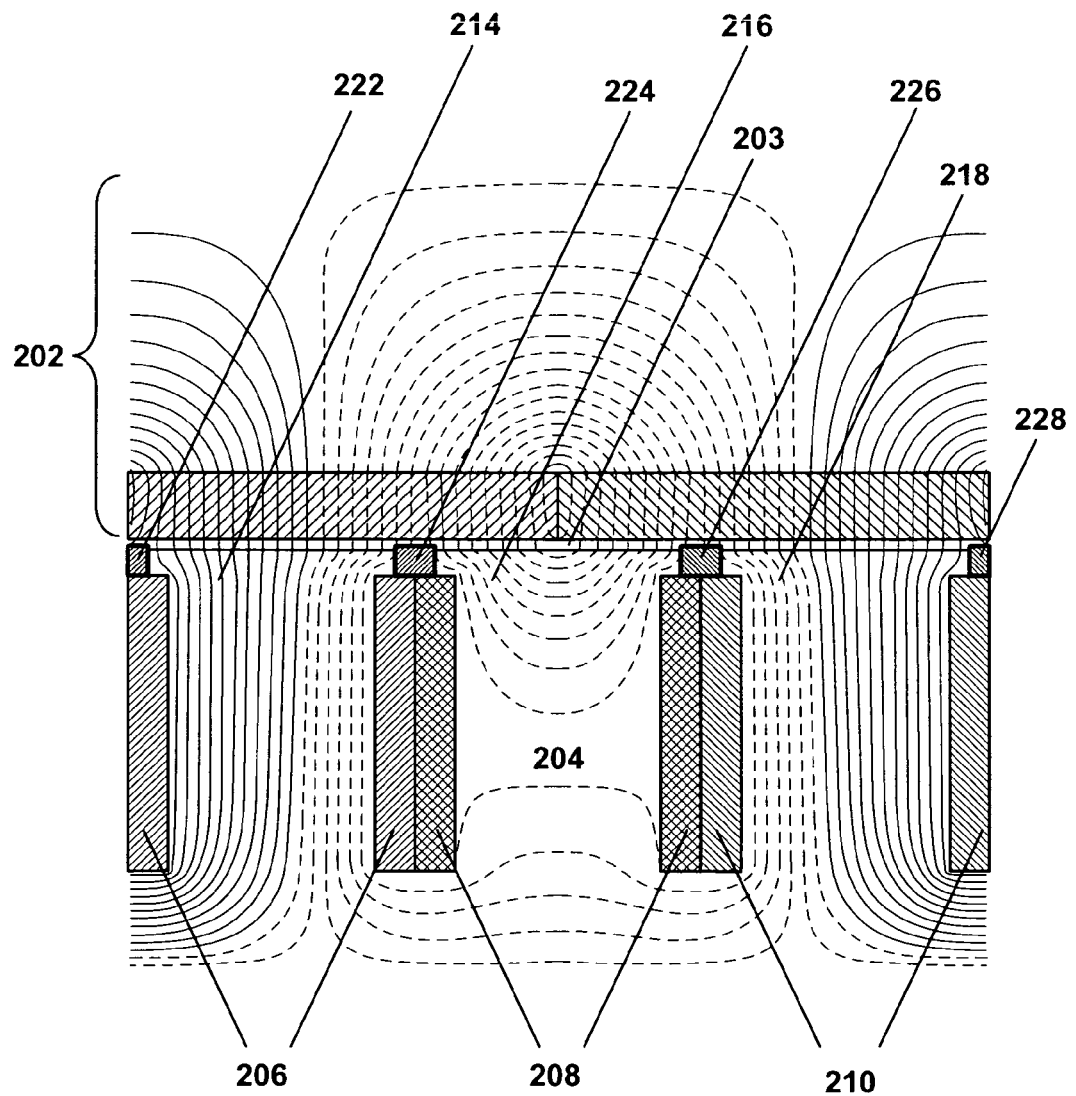
FIG. 5 is a diagram illustrating a pattern of magnetic fields in an actuator of the invention.

Operation of the passive damping is explained with reference to FIG. 5 that shows the magnetic filed lines within the configuration of the magnetic array 202 and the ferromagnetic structure 204. The magnetic flux, i.e., the density of the field lines, is much higher in the control current conductors 206 and 210, than in the current conductor 208. When the control current conductors 206 and 210 are driven by control currents with proper polarities, a Lorentz force is exerted on the ferromagnetic structure 204 in the tangential direction. When the ferromagnetic structure 204 moves relative to the magnets 202, e.g., to the left in the drawing, the flux initially coupled with the control current conductor 206 will couple increasingly more with the control current conductor 208. In order to generate a continuous force profile, the control current conductor 208 is driven with an increasing current in dependence on its position, whereas the current in the control current conductor 206 decreases in dependence on its position. This driving of the currents in dependence on relative position is called "commutation" in the literature. Note that the FIG. 5 illustrates a three-phase control system. However, similar considerations apply to any multiphase control configuration.

The Lorentz force law specifies the force F (a vector) on an electric current, having a current density J (a vector) and flowing in a magnetic field $B_{ext}$ (a vector) generated by an external source, as: $F=\int J \times B_{ext} dR$, wherein the quantity $J \times B_{ext}$ is the vector product of the current density J with the magnetic field $B_{ext}$, and wherein the integral is taken over the spatial region R wherein both J and $B_{ext}$ are not negligible. Force F depends linearly on the magnitude of current density J. However, the current flowing through the control conductors itself generates an additional magnetic field, which combines with the magnetic field of the magnets. This additional magnetic field is, in general, much weaker than the magnetic field of the magnets. For extreme values, however, this additional magnetic field becomes dominant. The magnetic field within the tooth portions of the ferromagnetic structure 204 increases until the ferromagnetic material saturates. Owing to this saturation, an increase in the control current does not lead anymore to a linear increase of the magnitude of the force.

The previously mentioned working principle is well known in the art. The invention now adds a passive mechanism to the actuator, in order to generate a damping force. The mechanism is designed such that it does not significantly affect the known force dependence on the control current.

Due to the relative movement of the ferromagnetic structure 204 and the magnetic array 202, a magnetic field is created within the air gap 203, as well as within the ferromagnetic structure 204. The field then varies with time and with position relative to the structure 204. Consider a closed path within the ferromagnetic structure, and consider an open surface of which the closed path forms the boundary. A voltage "e" and an electric field E are induced along the closed path as a result of the time-varying magnetic field experienced by the structure 204. The induced voltage e is given by the expression $e=\int E \cdot / ds$, wherein the line integral is taken around the closed path and wherein the vector/is the local unit vector tangential to the path. Using Maxwell's equations this can be re-written as $e=-\delta \phi / \delta t = \int\int (\delta B_{ext}/\delta t) \cdot n \, dS$, wherein the scalar quantity $\phi$ represents the magnetic flux through the surface, i.e., the surface integral of the scalar product of the local unit vector n perpendicular to the surface and the magnetic field $B_{ext}$. The vector $(\delta B_{ext}/\delta t)$ can be written as: $(\delta B_{ext}/\delta t) = (\delta B_{ext}/\delta z)(\delta z/\delta t)$, wherein scalar quantity $\delta z/\delta t$ is the relative speed "v" of the ferromagnetic structure 204 moving with respect to the magnetic array 202. Accordingly, the induced voltage "e" is proportional to relative speed "v".

As the path is closed, a current will flow that is proportional to the induced voltage and inversely proportional to the resistivity $\rho$ of the ferromagnetic material of the structure 204. This current is referred to as an eddy current having a current density $J_e$ with a magnitude according to $J_e = e/\rho$ and a direction $i_p$, wherein $\rho$ is the electrical resistivity of the material of the closed path and wherein the vector $i_p$ is the local unit vector tangential to the path.

This eddy current, in turn, interacts with the magnetic field of the magnetic array 202 and exerts a force $F_e$, which has a direction opposite to the direction of relative movement. Again, this force $F_e$ is linearly dependent on the magnitude of the induced eddy current until the ferromagnetic material of the structure 204 reaches saturation. Using the expressions introduced above, yields: $F_e = \int J_e \times B_{ext} \, dR = (e/\rho) \int i_p \times B_{ext} \, dR = -C \, v \, i_z$, wherein C is a constant, and wherein $i_z$ is the unit vector opposite to the direction of movement. Accordingly, the force $F_e$ depends linearly on the relative velocity. The minus sign indicates that force $F_e$ has a direction opposing the relative movement and is therefore a damping force.

In practical applications of the actuator, the electrical resistivity $\rho$ of the ferromagnetic material of the structure 204 resistivity is relatively large, as the resistivity in the direction of the eddy currents is increased by means of use of laminations. This is one of the reasons why the amount of passive damping obtained from the ferromagnetic material of the structure 204 is too weak for automotive damping applications. In the actuator of the invention, the passive damping relies on one or more additional damping current conductors 222-230 instead of on the ferromagnetic material of the structure 204.

In order to create a strong damping force, the damping current conductors 222-230 are made from a material that has a low electrical resistivity. The damping current conductors 222-230 are located at the structure 204, where changes in the magnetic field are large as a result of the relative movement of the magnetic array 202 and the structure 204. Furthermore, in order to not affect the force that is controlled by the currents in the control current conductors 206-210, the magnetic field generated by the currents induced in the damping current conductors 222-230 should not substantially affect the magnetic field generated by the magnet array 202 at the locations of the control current conductors 206-210. One option is to position the damping current conductors 222-230 of a low-resistivity material between the teeth 214, 216, 218 and 220, since the magnetic field generated by the induced eddy currents will not influence the magnetic field coupled to the control current conductors 206-210. This configuration is shown in the FIG. 5. Another option is to position within the air gap 203 a damping current conductor that is shaped as a tube or a tube segment, attached to, and surrounding, the structure 204. However, this latter option may result in that the additional magnetic field, generated by the eddy currents induced in the tube as a result of the relative movement, causes saturation of the ferromagnetic material of the structure 204. If saturation is reached, the force does not linearly depend anymore on the control currents. In the configuration of the FIG. 5, on the other hand, the additional magnetic field of the eddy currents, induced in the damping current conductors 222-230, does not penetrate deeply into the ferromagnetic material of the structure 204. As a consequence, the magnetic field of the magnetic array 202 is not substantially affected at the location of the control current conductors 206-210, and the linear dependence is left intact.

The diagrams of the FIGS. 1-5 illustrate the working principle of an actuator, with a tubular configuration wherein the forces are directed along the axis 105, i.e., are directed axially, in order to control the axial movement. The array of the magnets 109-117 is designed to generate a magnetic field, which varies in the axial direction, i.e., along the axis 105, but which is independent of an angle of rotation around the axis 105. The control current conductors 119-125 and the damping current conductor 127 are oriented so as to lie substantially in planes perpendicular to the axis 105 so as to experience a maximum change in the magnetic field upon a relative axial movement of the components 101 and 103.

Figure 6:
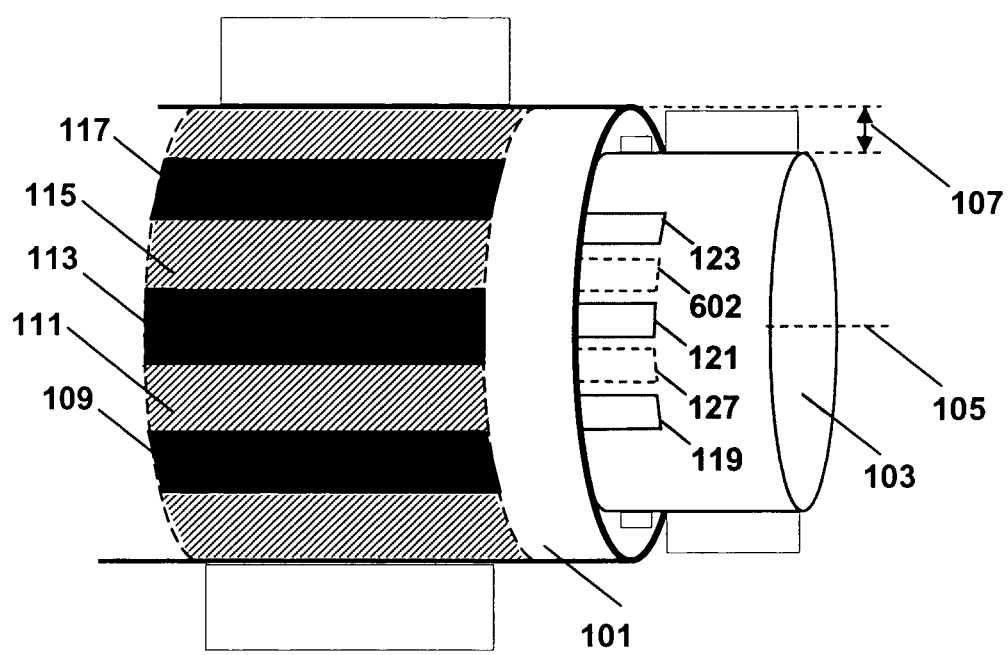
FIG. 6 is a diagram of a second type of an actuator in the invention.

FIG. 6 is a diagram, illustrating that the same working principle can also be applied to an actuator 600 of tubular configuration in order to control the angular movement, i.e., the relative rotary movement of the components 101 and 103 around the axis 105. In this latter configuration, the magnetic field of the magnets 109-117 is designed to depend on the angle of rotation around the axis 105, i.e., on the circumferential coordinate, and is independent of the axial coordinate within a predetermined range of axial movement. Now, the control current conductors 119-123 form loops that intersect the field lines of the magnetic field of the array of the magnets 109-117 when the components 101 and 103 rotate around the axis 105 relative to one another. As explained above, driving the control current conductors 119-123 with properly varying control currents causes controlled forces to be applied in the circumferential direction, i.e., a controlled torque to be exerted between the components 101 and 103.

The actuator 600 further comprises one or more damping current conductors, e.g., damping current conductors 127 and 602. The damping current conductors 127 and 602 provide a damping force as a result of the relative rotation of the components 101 and 103 relative to one another. Note that the damping force is a passive force in the sense that the damping effect is still present if the control circuitry (not shown) configured for driving the currents in the control current conductors 119-123, is disabled, e.g., as a result of a failure. Accordingly, the damping current conductors 127 and 602 can be used as a safety measure, e.g., in case the actuator 600 forms part of, e.g., an actively controlled torsion suspension system for a road vehicle.

Figure 7:
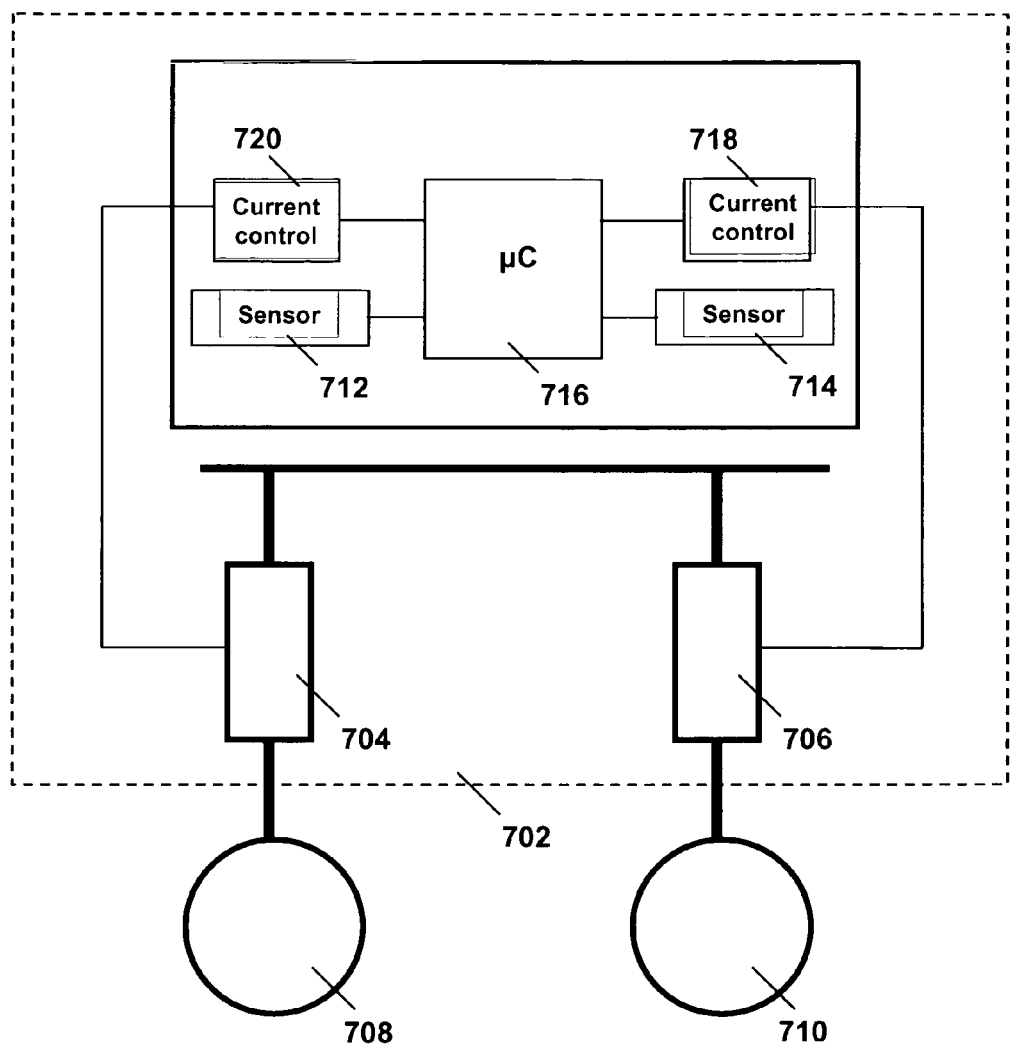
FIG. 7 is a block diagram of a vehicle's active damping system having an actuator of the invention.

FIG. 7 is a functional block diagram of a road vehicle 700 having a suspension system 702 using linear actuators 704 and 706 of the invention for control of the individual damping of each wheel 708 and 710 of the vehicle 700. The actuators 704 and 706 are modeled after, for example, the actuator 100 discussed above. The suspension system 702 comprises, in addition to the actuators 704 and 706, sensors 712 and 714 to sense the accelerations of the wheels 708 and 710 relative to the rest of the vehicle 700. The sensors 712 and 714 supply to a controller 716 sensor signals representative of the accelerations. The sensors 712 and 714 may be mounted on the chassis of the vehicle 700, or onto moving parts of the actuators 704 and 706. The controller 716 is operative to generate control signals in response to the sensor signals so as to actively control the actuators 704 and 706. In the example used, the control signals are representative of the currents to be supplied to the control current conductors, e.g., the control current conductors 119-125, of the actuators 704 and 706.

The accelerations of the wheels 708 and 710 are a result of the forces acting on the wheels 708 and 710. These forces are the reaction forces of the road surface as a result of e.g. cornering, braking, accelerating, irregularities in the road surface, etc. The forces are transmitted via the suspension system 702 to the rest (not shown) of the vehicle 700, e.g. the driver's compartment, the chassis or monocoque construction, and to the other wheels. Controlling these forces through damping enables to provide a higher level of comfort to the driver and passengers, to reduce wear on the vehicle 700, and also to provide the driver with a better control over the vehicle 700.

The controller 716 converts the sensor signals to the control signals, according to a pre-determined conversion procedure. For example, the conversion procedure is pre-programmed off-factory into the controller 716, and optimizes for e.g., comfort or vehicle handling. Multiple such conversion procedures may be pre-programmed into the controller 716, and made user-selectable via a proper user interface at the control panel (not shown) of the vehicle 700.

Now, if the path of the sensor signals, or the path of the control signals, or the controller 716 develops a failure, the active damping control is disabled. Therefore, the suspension system 702 uses one or more damping current conductors in the actuators 704 and 706, e.g., the conductor 127 or the conductors 222-230, as precautionary safety measures. As explained above, the damping current conductors provide a passive damping mechanism that does not rely on any external active controller.

The invention claimed is:

1. An electromagnetic actuator comprising:
   an arrangement of a first plurality of magnets for generating a magnetic field in a region adjacent to the arrangement; and
   a structure of a ferromagnetic material at least partly accommodated within the magnetic field and itself accommodating a second plurality of control current conductors, the structure including a plurality of teeth and the second plurality of control current conductors comprising a winding on each of the plurality of teeth; wherein:
   the arrangement and the structure are configured for moving relative to one another under control of respective control currents in respective ones of the second plurality of control current conductors;
   the arrangement and the structure are spatially separated by a gap;
   the magnetic field in the gap is oriented substantially perpendicular to a direction of relative movement; and
   the structure accommodates one or more damping current conductors, each respective one thereof forming a respective closed loop of an electrically conductive material, different from the ferromagnetic material, for providing a respective damping force induced by the relative movement.

2. The actuator of claim 1, wherein:
   the arrangement and the structure are configured for moving coaxially with respect to one another along a common axis;
   the first plurality of magnets forms a linear array parallel to the common axis;
   a specific one of the one or more damping current conductors is positioned in a specific plane, perpendicular to the common axis and comprising a specific one of the control current conductors; and
   the specific damping current conductor is positioned between the specific control current conductor and the arrangement.

3. The actuator of claim 1, wherein:
   the arrangement and the structure are configured for moving coaxially with respect to one another around a common axis;
   the first plurality of magnets forms a linear array around the common axis; and
   the one or more damping current conductors and the control current conductors together form a further linear array around the common axis.

4. The actuator of claim 1, wherein:
   the arrangement and the structure are configured for moving coaxially with respect to one another along a common axis;
   the first plurality of magnets forms a linear array parallel to the common axis; and
   the one or more damping current conductors are located on a plane perpendicular to the common axis and between adjacent teeth of the plurality of teeth.

5. The actuator of claim 1, wherein:
   the arrangement and the structure are configured for moving coaxially with respect to one another along a common axis;
   the first plurality of magnets forms a linear array parallel to the common axis; and the one or more damping current conductors at least partially radially overlie the winding on each of the plurality of teeth.

6. A suspension system configured for a wheeled vehicle including at least one electromagnetic actuator, the actuator comprising:
an arrangement of a first plurality of magnets for generating a magnetic field in a region adjacent to the arrangement; and
a structure of a ferromagnetic material at least partly accommodated within the magnetic field and itself accommodating a second plurality of control current conductors, the structure including a plurality of teeth and the second plurality of control current conductors comprising a winding on each of the plurality of teeth; wherein:
the arrangement and the structure are configured for moving relative to one another under control of respective control currents in respective ones of the second plurality of control current conductors;
the arrangement and the structure are spatially separated by a gap;
the magnetic field in the gap is oriented substantially perpendicular to a direction of relative movement; and
the structure accommodates one or more damping current conductors, each respective one thereof forming a respective closed loop of an electrically conductive material, different from the ferromagnetic material, for providing a respective damping force induced by the relative movement.

7. The suspension system according to claim 6, wherein,
the arrangement and the structure are configured for moving coaxially with respect to one another along a common axis;
the first plurality of magnets forms a linear array parallel to the common axis; and
the one or more damping current conductors are located on a plane perpendicular to the common axis and between adjacent teeth of the plurality of teeth.

8. The suspension system according to claim 6, wherein,
the arrangement and the structure are configured for moving coaxially with respect to one another along a common axis;
the first plurality of magnets forms a linear array parallel to the common axis; and
the one or more damping current conductors at least partially radially overlie the winding on each of the plurality of teeth.

9. A wheeled vehicle having a suspension system with at least one electromagnetic actuator: and wherein the actuator comprises:
an arrangement of a first plurality of magnets for generating a magnetic field in a region adjacent to the arrangement; and
a structure of a ferromagnetic material at least partly accommodated within the magnetic field and itself accommodating a second plurality of control current conductors, the structure including a plurality of teeth and the second plurality of control current conductors comprising a winding on each of the plurality of teeth; wherein:
the arrangement and the structure are configured for moving relative to one another under control of respective control currents in respective ones of the second plurality of control current conductors;
the arrangement and the structure are spatially separated by a gap;
the magnetic field in the gap is oriented substantially perpendicular to a direction of relative movement; and
the structure accommodates one or more damping current conductors, each respective one thereof forming a respective closed loop of an electrically conductive material, different from the ferromagnetic material, for providing a respective damping force induced by the relative movement.

10. The wheeled vehicle according to claim 9, wherein,
the arrangement and the structure are configured for moving coaxially with respect to one another along a common axis;
the first plurality of magnets forms a linear array parallel to the common axis; and
the one or more damping current conductors are located on a plane perpendicular to the common axis and between adjacent teeth of the plurality of teeth.

11. The wheeled vehicle according to claim 9, wherein,
the arrangement and the structure are configured for moving coaxially with respect to one another along a common axis;
the first plurality of magnets forms a linear array parallel to the common axis; and
the one or more damping current conductors at least partially radially overlie the winding on each of the plurality of teeth.

* * * * *